United States Patent
Fukumoto et al.

[11] Patent Number: 5,833,781
[45] Date of Patent: Nov. 10, 1998

[54] PNEUMATIC TIRE FOR HEAVY LOAD

[75] Inventors: Tetsuhiro Fukumoto, Kobe; Tatsuo Kimura, Akashi, both of Japan

[73] Assignee: Sumitomo Rubber Industries, Ltd., Hyogo, Japan

[21] Appl. No.: 738,905

[22] Filed: Oct. 28, 1996

Related U.S. Application Data

[62] Division of Ser. No. 709,625, Sep. 9, 1996, which is a continuation of Ser. No. 364,828, Dec. 27, 1994, abandoned.

[30] Foreign Application Priority Data

Dec. 27, 1993 [JP] Japan ................................. 5-331561
Sep. 7, 1994 [JP] Japan ................................. 6-213524

[51] Int. Cl.⁶ ........................ B60C 11/12; B60C 105/00; B60C 107/00
[52] U.S. Cl. ................................. 152/209 R; 152/DIG. 3
[58] Field of Search ......................... 152/209 R, 209 D, 152/DIG. 3

[56] References Cited

U.S. PATENT DOCUMENTS

| | | | |
|---|---|---|---|
| 4,200,134 | 4/1980 | Takigawa et al. ................. | 152/209 R |
| 5,131,444 | 7/1992 | Kukimoto et al. . | |
| 5,323,825 | 6/1994 | Yamagishi et al. ................. | 152/209 R |
| 5,345,988 | 9/1994 | Kabe et al. . | |

FOREIGN PATENT DOCUMENTS

| | | | |
|---|---|---|---|
| 313361 | 4/1989 | European Pat. Off. . | |
| 356369 | 2/1990 | European Pat. Off. . | |
| 2302875 | 1/1976 | France . | |
| 2816626 | 10/1978 | Germany . | |
| 36706 | 3/1983 | Japan . | |
| 2-88311 | 3/1990 | Japan ................................. | 152/209 R |
| 2-88312 | 3/1990 | Japan ................................. | 152/209 R |
| 2-169305 | 6/1990 | Japan . | |
| 63704 | 2/1992 | Japan . | |
| 5-246213 | 9/1993 | Japan ................................. | 152/209 R |
| 5-319027 | 12/1993 | Japan . | |
| 5-319028 | 12/1993 | Japan . | |
| 6-80002 | 3/1994 | Japan ................................. | 152/209 D |

OTHER PUBLICATIONS

Patent Abstracts of Japan, vol. 14, No. 285, Jun. 20, 1990, WPI/Database Week 9402;JO5319029.

*Primary Examiner*—Steven D. Maki
*Attorney, Agent, or Firm*—Birch, Stewart, Kolasch & Birch, LLP

[57] ABSTRACT

A pneumatic tire for a heavy load is provided which prevents irregular abrasion generated at the edge of land portions of the tire tread. An irregular abrasion preventing land portion is thus formed at the edge of a land portion, inside the shoulder edge of the tire, whereby the irregular abrasion generated at this portion is prevented.

5 Claims, 18 Drawing Sheets

PNEUMATIC TIRE FOR HEAVY LOAD

This application is a divisional of application Ser. No. 08/709,625, filed on Sept 9, 1996, which is a continuation of application Ser. NO. 08/364,828, filed Dec. 27, 1994, now abandoned.

BACKGROUND OF THE INVENTION

The present invention relates to a pneumatic tire for heavy load which is adapted to prevent irregular abrasion from being generated at a shoulder-side edge of a land located inside a land of a shoulder edge.

It is necessary to control the shape of a tire when the tire hits the ground in order to improve the operativity and abrasion resistance of the tire for heavy load having a tread radius and amounts of camber at the central part of the tread and the shoulder edges.

When the above shape is elliptic, in spite of the favorable operativity and wandering performance, the shoulder edges become easy to slip on the road surface because of the lower pressure in the vicinity thereof when the tire is in touch with the ground, whereby the shoulder edges are easily and irregularly abraded.

If the shoulder is arranged to be in touch with the ground over a longer distance so as to increase the touch pressure in the vicinity of the shoulder edge and thus lessen the sliding abrasion, and if the touching length at the central part of the tread is maintained at a certain value to maintain the operativity (linear motion stability, response characteristic of a steering wheel), the touch pressure at a second land counted from the shoulder edge becomes lower than at the other parts, and therefore the edge of the second land at the side of the shoulder is not uniformly abraded. This irregular abrasion spreads gradually over the entire width of the land, leading to punching of the land.

Under these circumstances, forming of a small step-like land has been proposed to eliminate the irregular abrasion described above (e.g., Japanese Patent Laid-Open Publication Nos. 2-169305, 2-88312, and 2-88311).

However, in the conventional technique, the step-like land is sometimes out of touch with the ground depending on the condition of use (condition of the load), which invites an irregular abrasion at the edge of the second land seen from the shoulder's edge. In the case where a notch is cut at a part of the second land closer to the center of the tire, it is disadvantageously impossible to avoid the irregular abrasion due to the twisting force brought about by the notch.

SUMMARY OF THE INVENTION

Accordingly, an object of the present invention is to provide a pneumatic tire for a heavy load which can prevent irregular abrasion at a land portion inside the shoulder edge, particularly, at the edge of the second land at the shoulder edge side which is counted from the shoulder edge.

In accomplishing these and other objects, according to one aspect of the present invention, there is provided a pneumatic tire for heavy load comprising:

an irregular abrasion preventing land formed, via a slim groove extending in the circumferential direction of the tire, at the shoulder side of a second land counting from the shoulder's edge and a plurality of inside notches formed at an edge of the second land at the side where there is, a second main groove, wherein the irregular abrasion preventing land is generally at the same height as the second land, excluding the irregular abrasion preventing land, when the tire is not in use, the abrasion preventing land has a width which changes along the circumferential direction, such that the abrasion preventing land includes wide parts of a large width and narrow parts of a smaller width in the axial direction of the tire and the inside notches and narrow parts are alternately disposed in the circumferential direction of the tire.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE EMBODIMENTS

Figure 1:
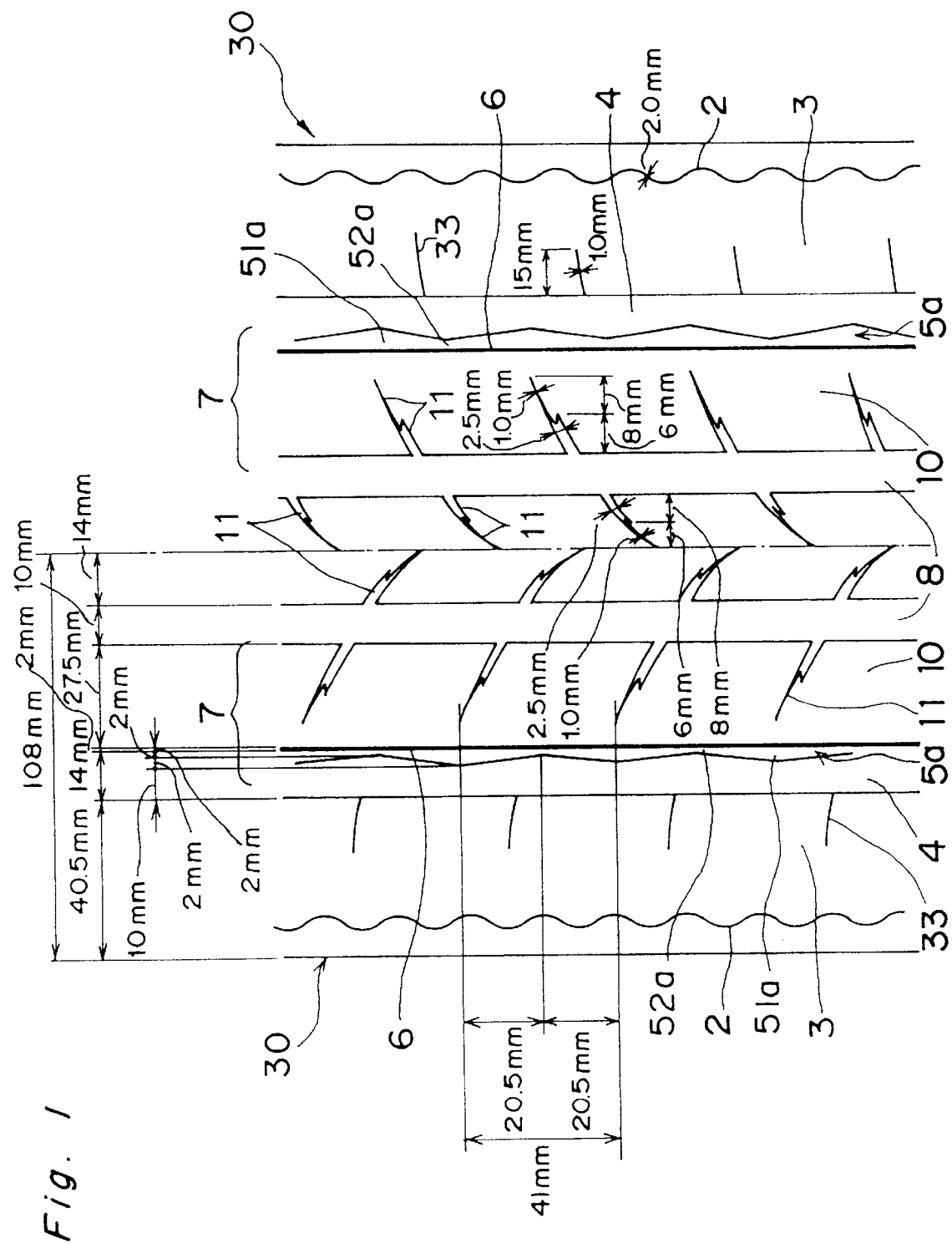
FIG. 1 is a partially-enlarged plan view of a pneumatic tire for heavy load according to a first embodiment of the present invention.

Before the description of the present invention proceeds, it is to be noted that like parts are designated by like reference numerals throughout the accompanying drawings.

Preferred embodiments of the present invention will be fully discussed hereinbelow with reference to FIGS. 1–17, 18A, 18B, and 18C.

Figure 11A:
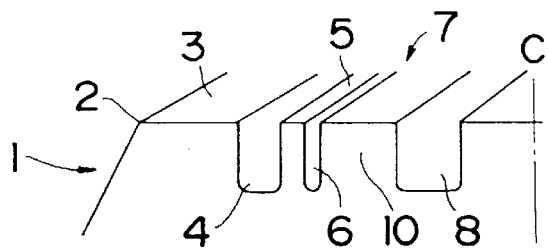
FIG. 11A is a perspective view of the tire of FIG. 1.

FIG. 1 indicates a pneumatic tire for a heavy load in accordance with a first embodiment of the present invention. As shown in FIGS. 1 and 11A, the tire has main grooves 4, 8 extending continuously in the circumferential direction and lands separated by the main grooves on a tread 1 of the tire. More specifically, referring to FIG. 1, a first land 3, a first main groove 4, a second land 7, and the second main groove 8 are formed in this order from a shoulde's edge 2 to the center C of the tread 1. The second land 7 has, at the side of the shoulder, a slim irregular abrasion preventing land 5a separated from a main body 10 of the second land 7 by a slim groove 6. The main body 10 is hence the remaining part of the second land 7 with the irregular abrasion preventing land 5a excluded. Inside notches 11 are formed at predetermined distance at the edge of the main body 10 at the side closer to the center of the tire. The notches are slots or sipes, etc. to ensure the traction. Reference numeral 33 in FIG. 1 denotes a notched part in the first land 3.

Figure 9:
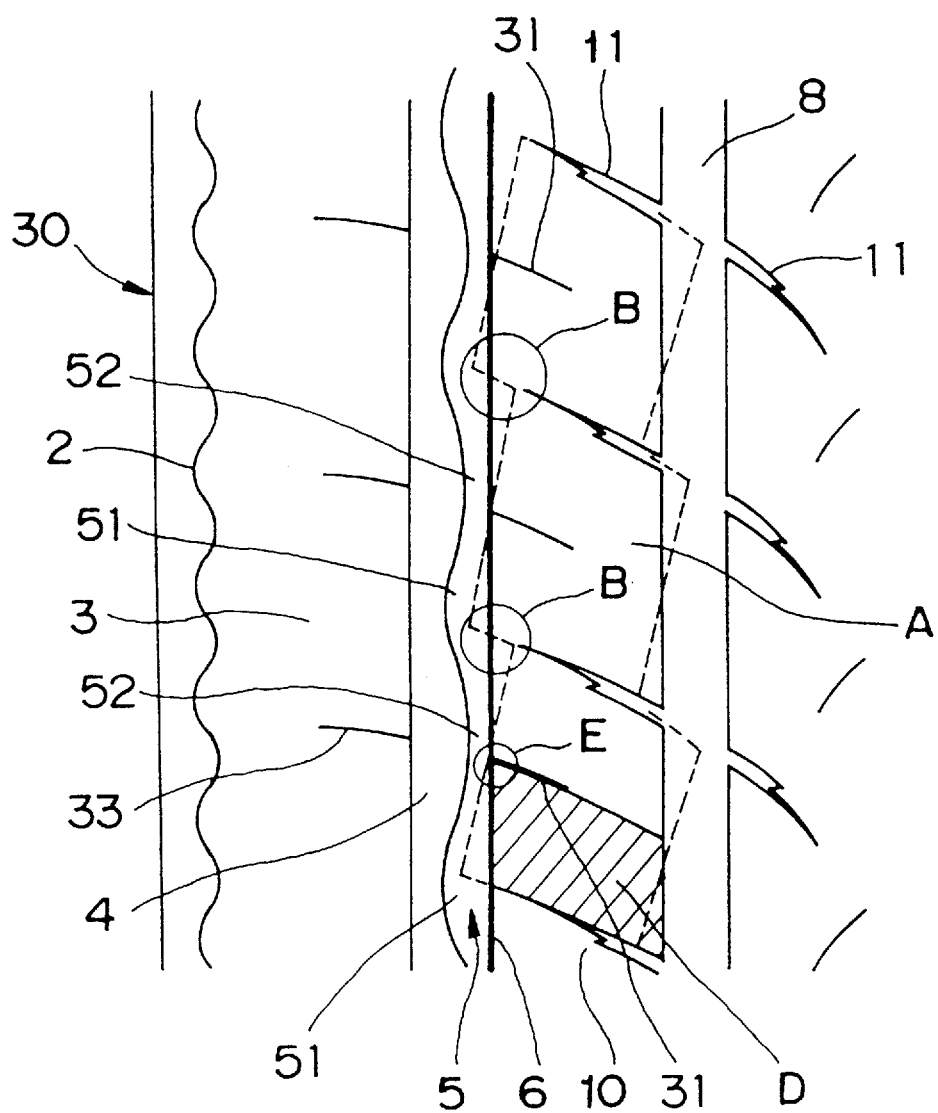
FIG. 9 is a diagram explanatory of the configuration of an irregular abrasion preventing land in the embodiment of the present invention.

When the tire is not in use, the above-described irregular abrasion land 5a is generally of the same height as the main body 10 and changes in its width in the circumferential direction of the tire. In other words, the irregular abrasion preventing land 5a has such a flat configuration that the land 5a has wide parts 51a projecting in a generally triangular shape into the main groove 4 and narrow parts 52a recessed in a triangular shape from the main groove, said wide and narrow parts being continuously, alternately arranged. Each wide part 51a is located at 9 confronting position to the end of the inside notch 11. The narrow parts 52a are alternately positioned between to the end parts of the inside notches 11, in the circumferential direction of the tire. The reason for the formation of the wide and narrow parts will be described below. In FIG. 9, when a vehicle turns, a land A which is the part between the adjacent two inside notches 11 and with is a part of the main body 10 is apt to twist in a direction shown by a broken line in FIG. 9 (in the clockwise direction in FIG. 9) or in the opposite direction thereto. Because of the twist, the distortion of a tread rubber at a part B is increased, generating the irregular abrasion which spreads from the part B to the whole of the land. As such, if the irregular abrasion preventing land 5 adjacent to the part B is formed wide in the circumferential direction of the tire to enhance rigidity, the distortion of the part B is decreased and the difference of the distortion at the outer side, in the axial direction of the main body 10, is reduced. The irregular abrasion can be accordingly prevented. In other words, since the slim groove 6 is narrow in width, the preventing land 5 is allowed to come in contact with the main body 10 when the tire touches the ground, so that the aforementioned interaction is effected.

Figure 10:
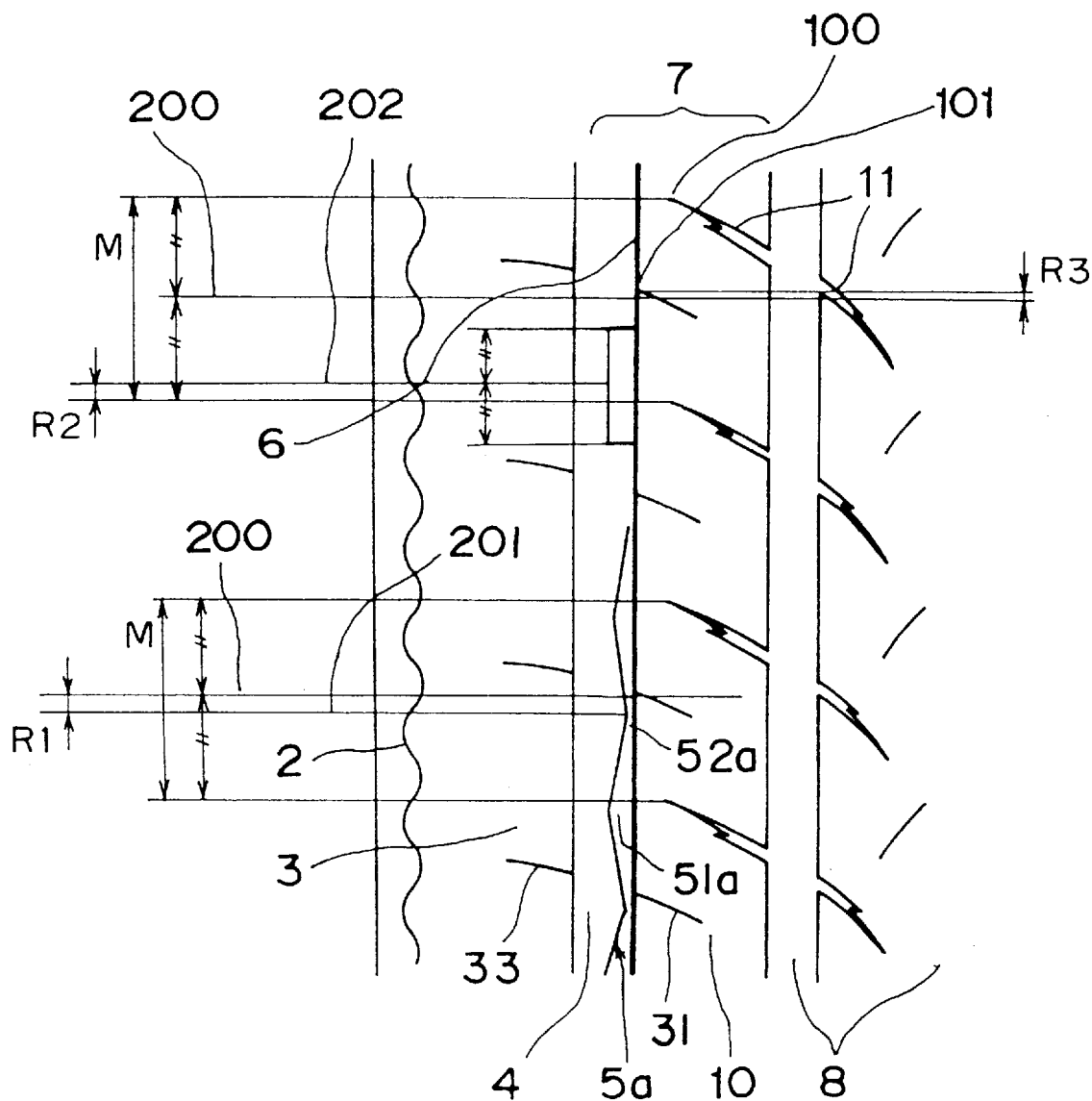
FIG. 10 is a diagram explanatory of the positional relationship of the irregular abrasion preventing land in the embodiment of the present invention.

The positional relationship of the narrow parts 52a and the inside notches 11 will be depicted with reference to FIG. 10. In FIG. 10, a reference position for each inside notch 11 in the circumferential direction of the tire is set at an outer end 100 in the axial direction of the inside notch 11. Although it is desired that a line 200 corresponds to the a center axis of the distance M between the outer end 100 and the outer end of the adjacent inside notch 11 as does line 201 which is at the center axis of the narrow part 52a of the irregular abrasion preventing land 5, it is allowable if the shifting amount R1 therebetween is not larger than 0.3 times, more preferably, not larger than 0.2 times the distance M of the adjacent inside notches 11. When the shifting amount is larger than the above value, it is impossible to prevent the irregular abrasion caused by the twisting force of the main body 10.

More specifically, the first embodiment is of the size as shown in FIG. 1 as a specific example. The width of the first main groove 4 is 14 mm and the wide part 51a and the narrow part 52a of the irregular abrasion preventing land 5a have respectively 4 mm maximum width and 2 mm minimum width. The width of the slim groove 6 is 2 mm, the distance between the centers of the wide and narrow parts 51a and 52a is 20.5 mm, while the distance from a touching end 30 of the tire in touch with the ground to an outer side edge of the first main groove 4 is 40.5 mm. The distance to the center of the tire from the touching end 30 is 108 mm. The main body 10, the second main groove 8, and the inside notch 11 in the widthwise direction of the tire are 27.5 mm wide, 10 mm wide, and 14 mm wide, respectively. Moreover, a 2.5 mm-width wide part and a 1 mm-width narrow part of the inside notch 11 are 6 mm and 8 mm long in the widthwise direction of the tire. The inside notch 11 is formed 11.0 mm deep. The first and second main grooves 4, 8 are 14 mm in depth, whereas the slim groove 6 is 11 mm in depth. The notched part 33 of the first land 3 has 1.0 mm width. The tire is 15 mm wide in the circumferential direction thereof and 11.0 mm deep. The shoulder edge is 2.0 mm wide and 11 mm deep. The distance M between outer ends of the adjacent notches 11 in the axial direction is 41 mm. In the first embodiment, the center of the narrow part 52a of the preventing land 5a is positioned at the center of the distance between the adjacent two inside notches 11.

A pneumatic tire for heavy load according to a second embodiment of the present invention will be discussed hereinbelow.

Figure 2:
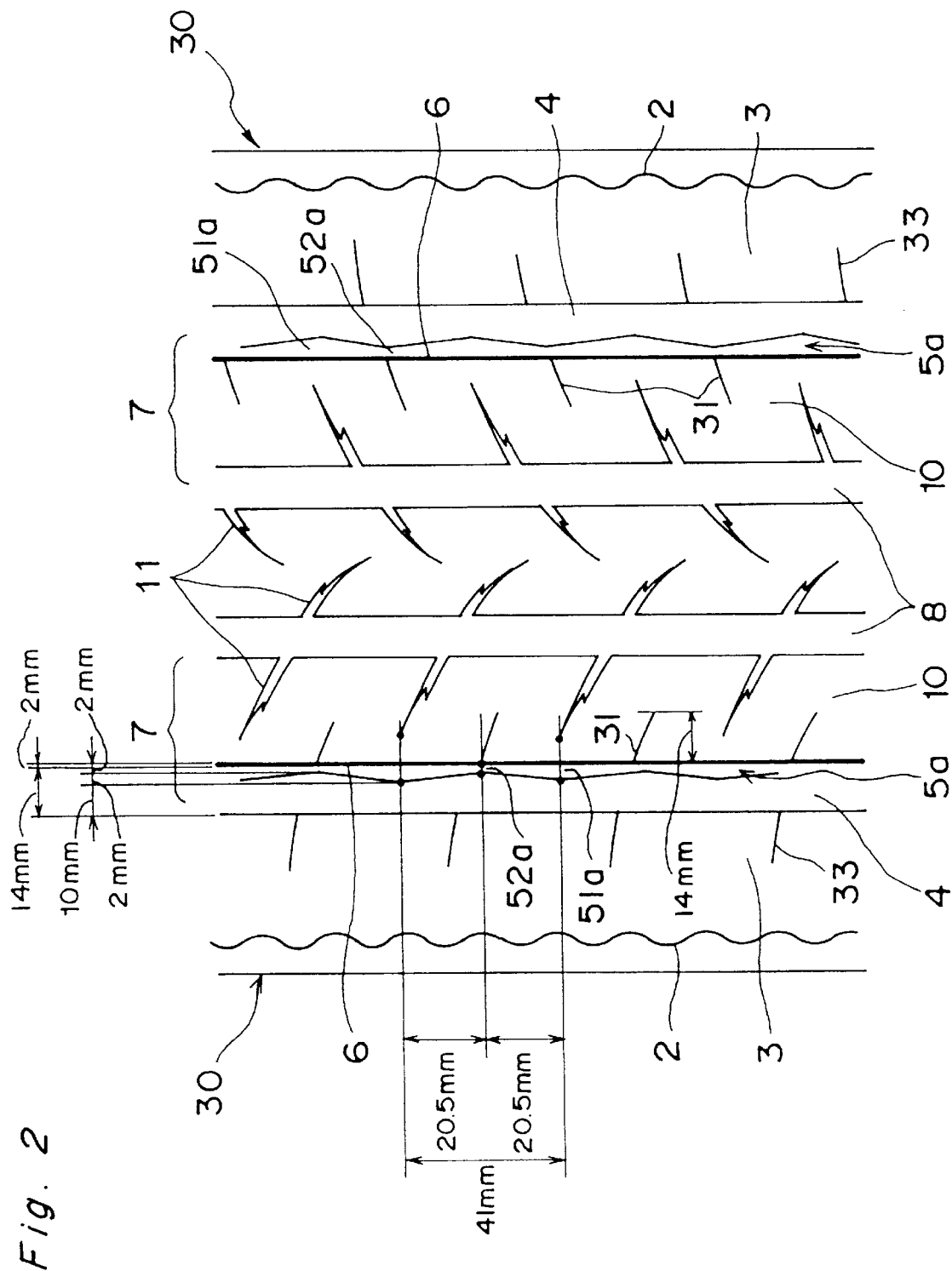
FIG. 2 is a partially-enlarged plan view of a pneumatic tire for heavy load according to a second embodiment of the present invention.

In the second embodiment shown in FIG. 2, many outside notches 31 are formed every predetermined distance at the side of the irregular abrasion preventing land 5a of the main body 10 of the tire of the first embodiment in FIG. 1. Since the outside notches 31 are alternately arranged to the inside notches 11 in the circumferential direction, a twisting part of the land is turned to a partial land D of the land A. The partial land D is smaller than the land A, reducing the distance from the part B where the distortion is large to the twisting center, so that the amount of distortion of the part B is lessened. Therefore, the irregular abrasion at the part B is effectively prevented. An adequate amount of movement is permitted in the vicinity of an outer end E of the outside notch 31 in the axial direction, and consequently the distortion is not so large as at the above part B. If the number of the inside notches 11 is increased twice instead of forming the outside notches 31, the rigidity in the middle part of the adjacent inside notches 11 is decreased so much as to cause missing or loss of rubber, etc.

As is clear from FIG. 10, when a reference position of the outside notch 31 in the circumferential direction of the tire is set at an outer end 101 of the outside notch 31 in the axial direction, it is desirable that the line 200 in the direction of the center axis of the distance M between the outer ends 100 of the adjacent inside notches 11 in the axial direction agrees with the above outer end 101. However, if the line 200 shifts from the outer end 101, the shifting amount R3 is preferably not larger than 0.3 times the distance M, more favorably, not larger than 0.2 times the distance M. It becomes impossible to prevent the irregular abrasion due to the twisting force of the main body 10 if the shifting amount R3 exceeds the aforementioned value.

The size of each part in the second embodiment as a specific example is generally the same as that of the first embodiment, except that the outside notch 31 is 14 mm wide in the circumferential direction of the tire and 11.0 mm deep.

Figure 3:
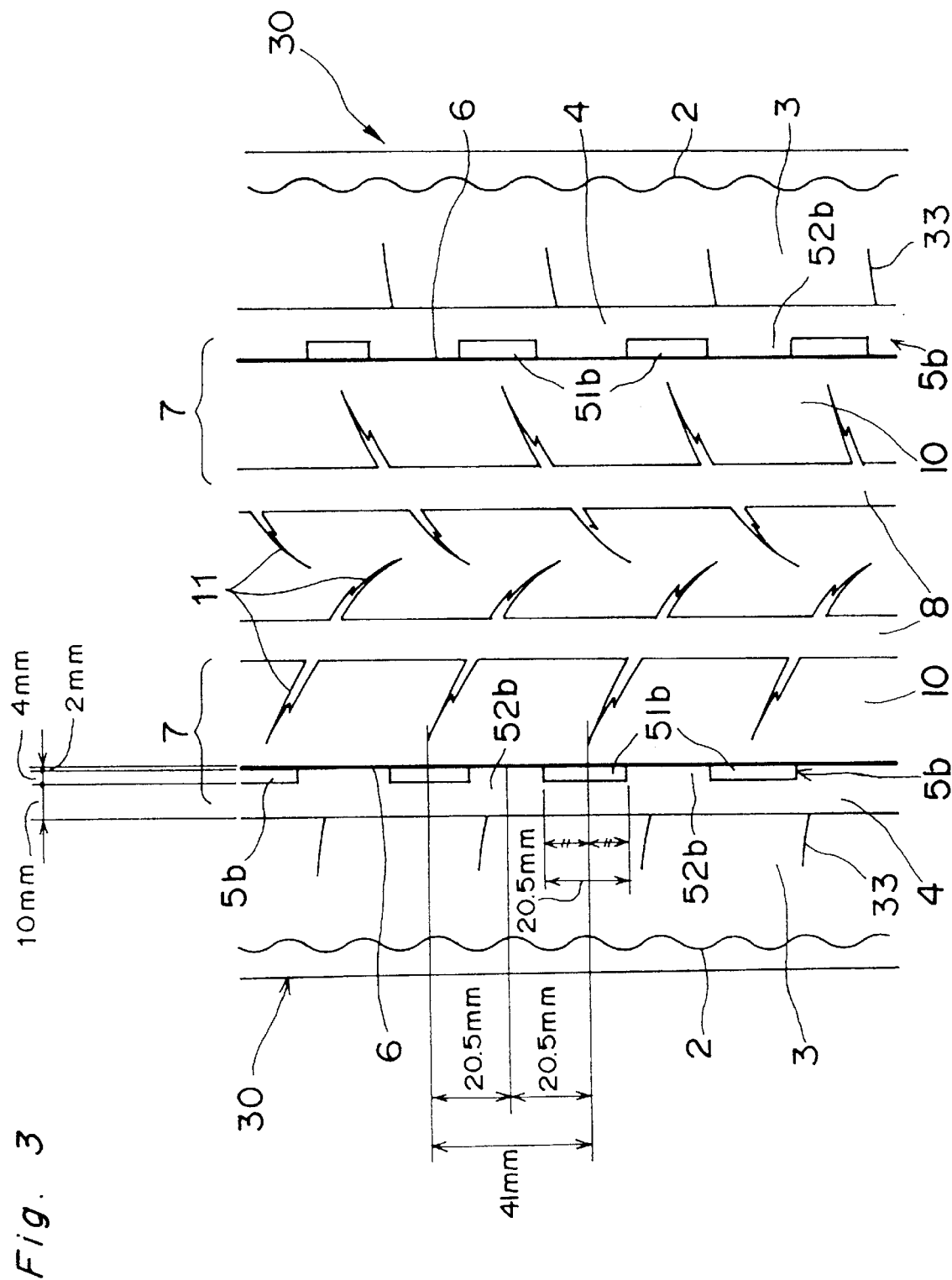
FIG. 3 is a partially-enlarged plan view of a pneumatic tire for heavy load according to a third embodiment of the present invention.

FIG. 3 shows a pneumatic tire for heavy load according to a third embodiment of the present invention.

An irregular abrasion preventing land 5b in the tire of the third embodiment assumes a different shape from that of the preventing land 5a of the first embodiment. That is, an irregular abrasion preventing land 5b of the third embodiment is constituted of rectangular, flat irregular abrasion preventing blocks 51b divided by lateral grooves 52b communicating with the first main groove 4 and extending in the widthwise direction of the tire. The irregular abrasion preventing blocks 51b are generally of the same height as the main body 10 when the tire is not in use and are so disposed as to confront the inside notches 11 in the circumferential direction.

Referring again to FIG. 10, although it is suitable that the outer end 100 of the inside notch 11 agrees with the line 202 in a direction of the center axis of the preventing block 51b, the shifting amount R2 if any is suitably not larger than 0.3 times, more favorably, 0.2 times the distance M of the adjacent inside notches 11. In the event that the value is exceeded, the irregular abrasion as a result of the twisting force of the main body 10 is impossible to avoid.

The tire according to the third embodiment as a specific example is constituted generally in the same size as in the first embodiment. A difference is that the preventing block 51b is 4 mm wide and 20.5 mm long, and the lateral groove 52b is 4 mm wide and 20.5 mm long. The center of the preventing land 5b is agreed with the outer end of the inside notch 11 in the third embodiment.

Figure 4:
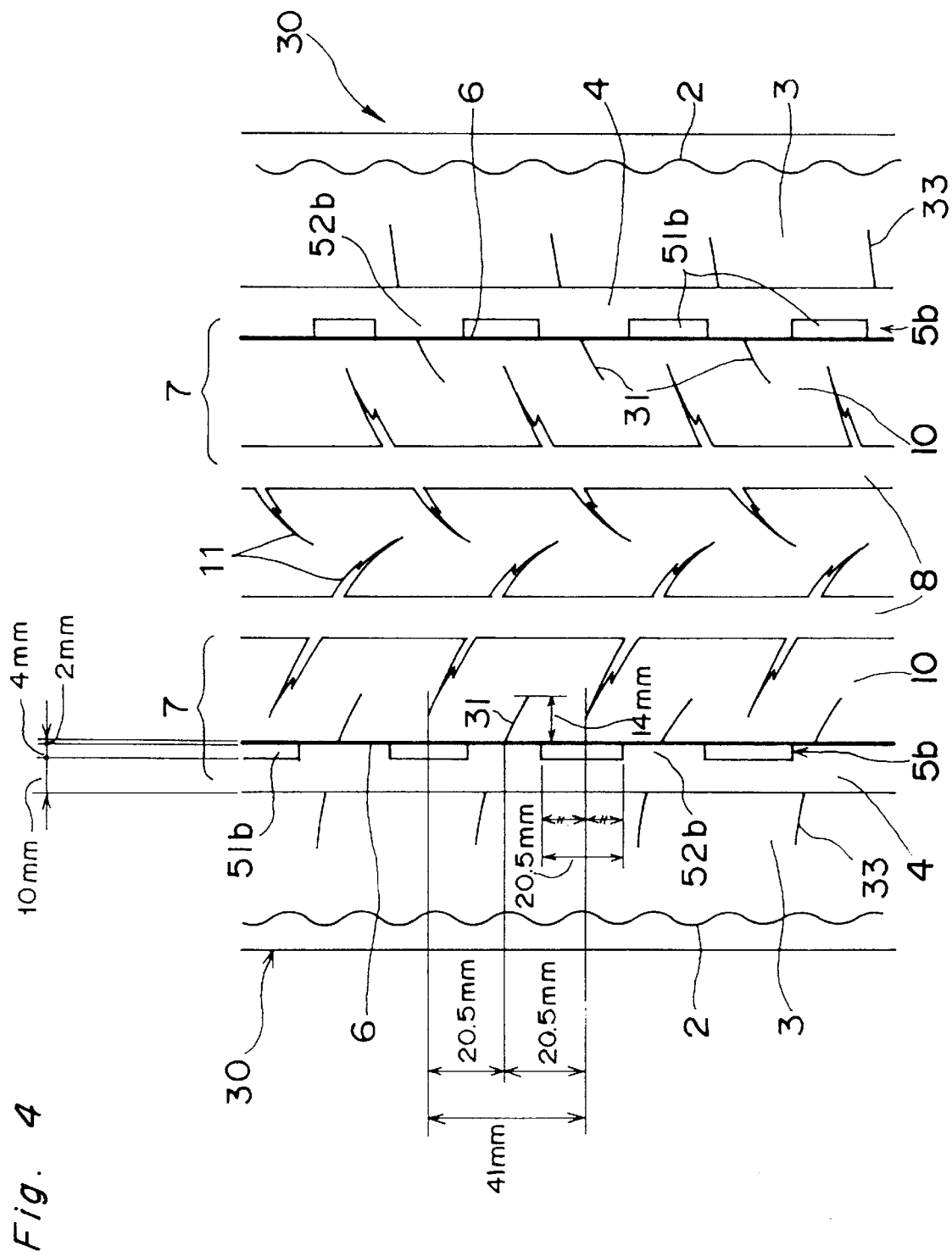
FIG. 4 is a partially-enlarged plan view of a pneumatic tire for heavy load according to a fourth embodiment of the present invention.

FIG. 4 is a pneumatic tire for heavy load according to a fourth embodiment of the present invention.

The tire of the fourth embodiment has many outside notches 31 formed every predetermined distance at the side of the irregular abrasion preventing land 5b of the main body 10 of the tire of the third embodiment shown in FIG. 3. The outside notches 31 are alternately disposed to the inside notches 11 in the circumferential direction of the tire. The reason for this arrangement is the same as that described above in conjunction with the second embodiment.

Concretely, the fourth embodiment as a specific example is different in size from the third embodiment only in that the outside notch 31 is 14 mm wide and 11.0 mm deep.

Figure 5:
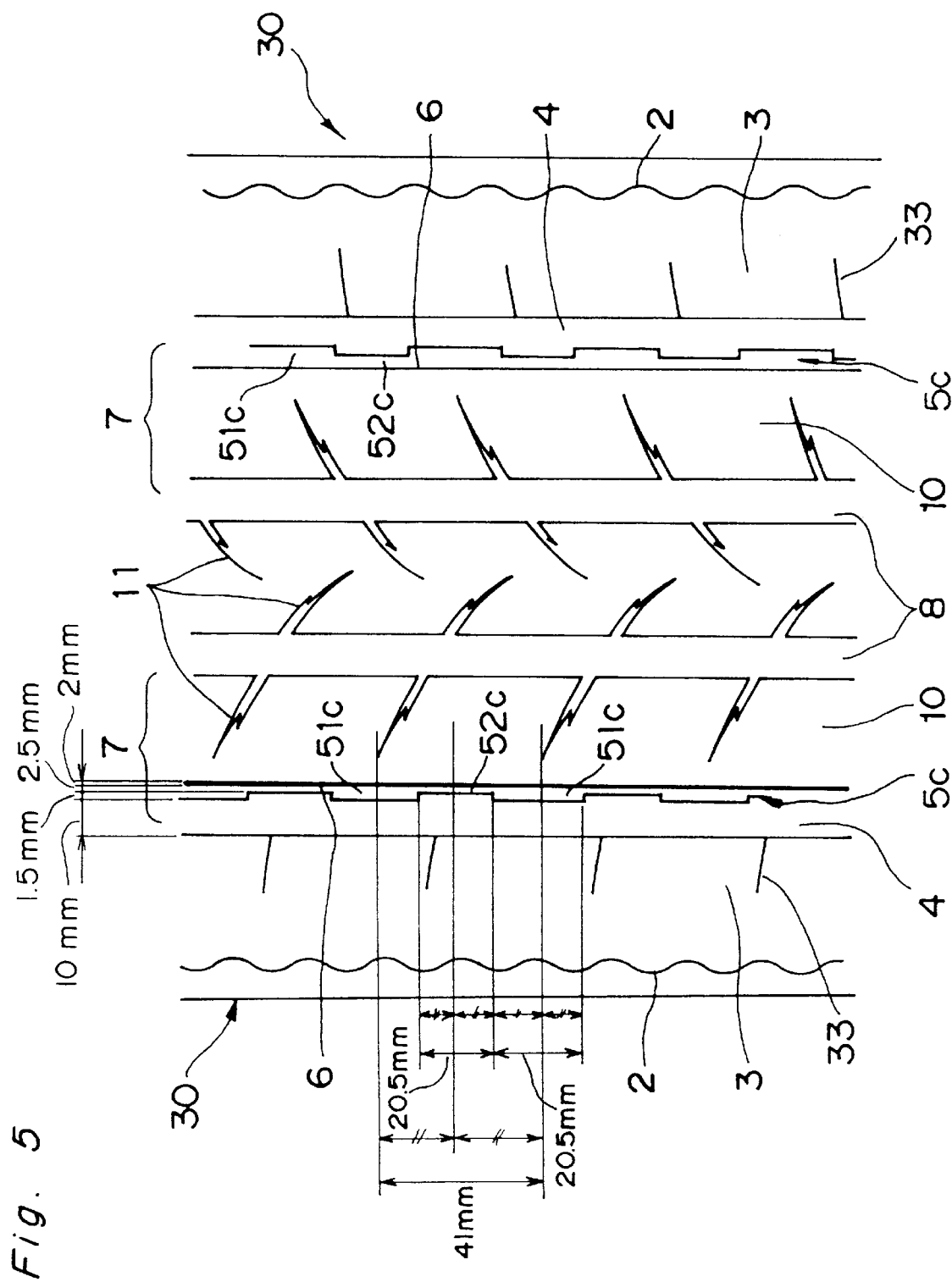
FIG. 5 is a partially-enlarged plan view of a pneumatic tire for heavy load according to a fifth embodiment of the present invention.

A pneumatic tire for heavy load according to a fifth embodiment of the present invention is illustrated in FIG. 5.

The tire is provided with an irregular abrasion preventing land 5c which is different in shape from that of the first embodiment. More specifically, wide parts 51c of the irregular abrasion preventing land 5c which correspond to the preventing blocks 51b of the preventing land 5b in the third and fourth embodiments are integrally coupled each other at narrow parts 52c. When the tire is not in use, the preventing land 5c has generally the same height as the main body 10, with the wide parts 51c arranged to confront the inside notches 11 in the circumferential direction of the tire.

The size of the tire according to the fifth embodiment of the present invention as a specific example is generally the same as that of the first embodiment. A different point is that the wide part 51c has 4 mm width and 20.5 mm length, and the narrow part 52c has 2.5 mm width and 20.5 mm length. In the fifth embodiment of the present invention, the center of the wide part 51c is agreed with the outer end of the inside notch 11.

Figure 6:
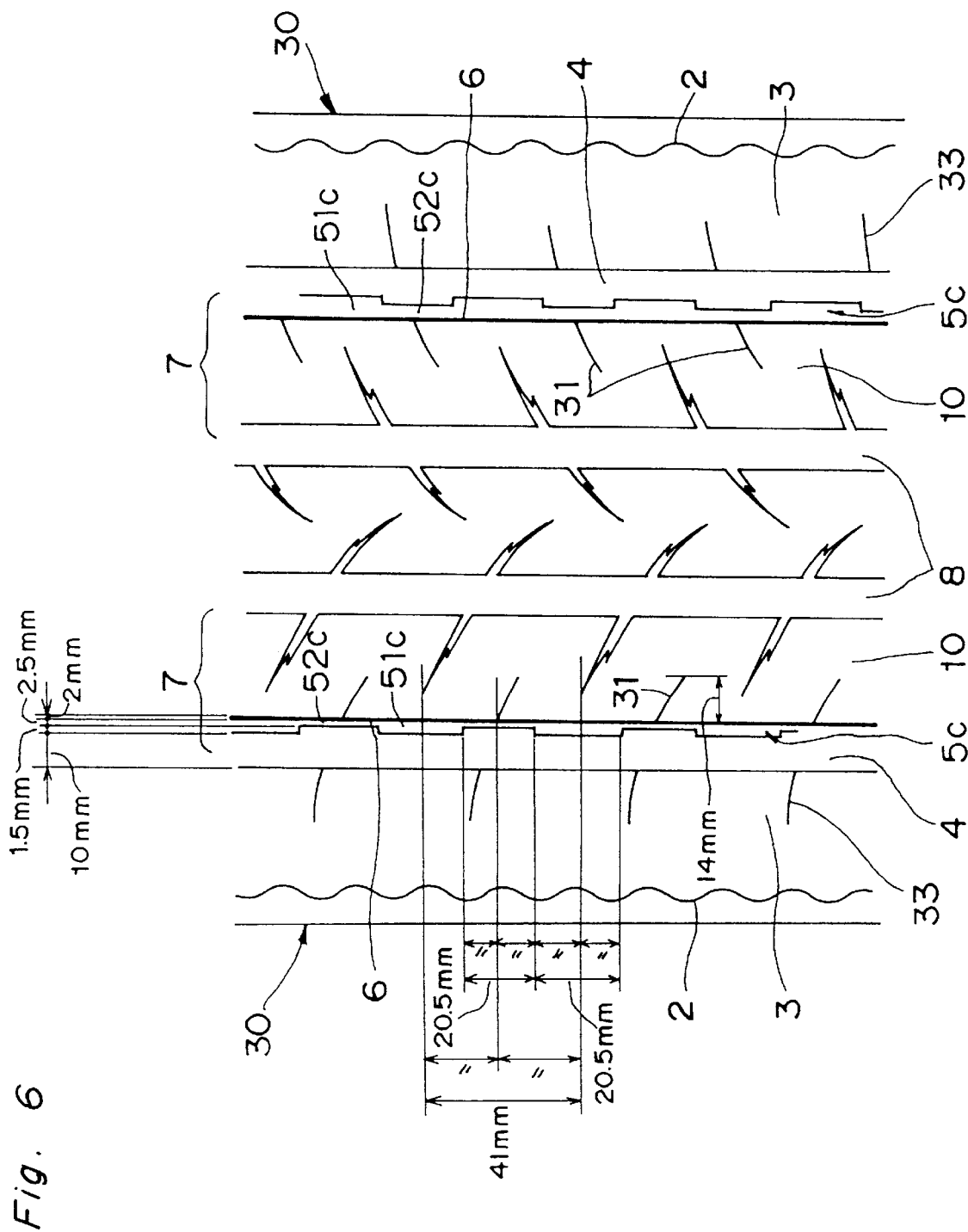
FIG. 6 is a partially-enlarged plan view of a pneumatic tire for heavy load according to a sixth embodiment of the present invention.

In FIG. 6 is indicated a pneumatic tire for heavy load according to a sixth embodiment of the present invention.

According to the sixth embodiment, many outside notches 31 are formed every predetermined distance at the side of the irregular abrasion preventing land 5c of the main body 10 of the tire of the above fifth embodiment shown in FIG. 5. The outside notches 31 and the inside notches 11 are alternately arranged in the circumferential direction of the tire by the same reason as in the second embodiment.

The tire of the sixth embodiment as a specific example is in the structure of generally the same size as that of the fifth embodiment except that each outside notch 31 has 14 mm width and 11.0 mm depth.

Figure 7:
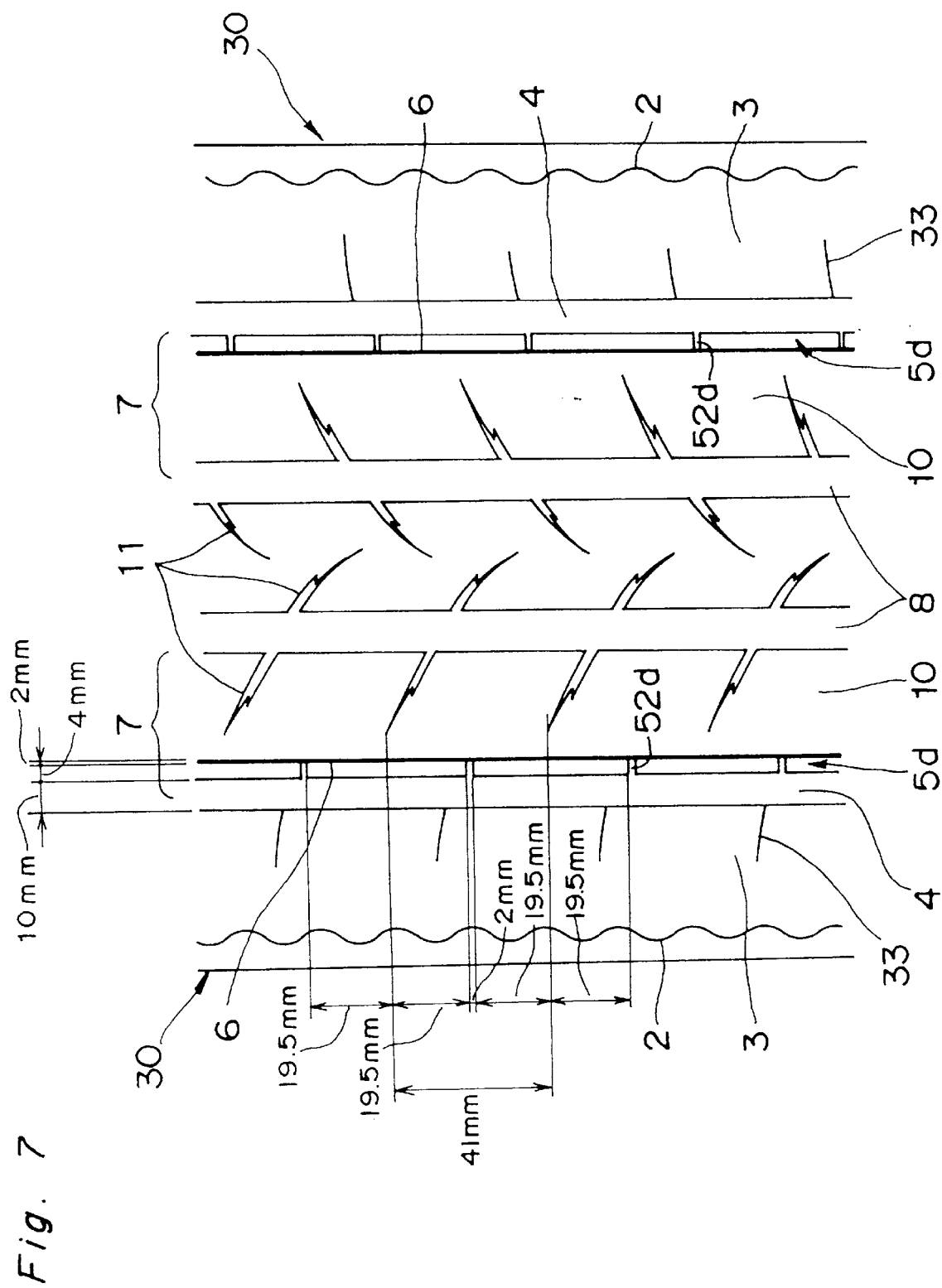
FIG. 7 is a partially-enlarged plan view of a pneumatic tire for heavy load according to a seventh embodiment of the present invention.

A pneumatic tire for heavy load shown in FIG. 7 is in accordance with a seventh embodiment of the present invention.

An irregular abrasion preventing land 5d in the seventh embodiment is different in size from the land 5a of the first embodiment. In other words, the irregular abrasion preventing land 5d is formed of many rectangular flat irregular abrasion preventing blocks 51d divided by lateral grooves 52d communicating with the first main groove 4 and extending along the widthwise direction of the tire. The lateral groove 52d has small width. The preventing blocks 51d are generally in the same height as the main body 10 when the tire is not in use, and confront the inside notches 11 in the circumferential direction.

The tire of the seventh embodiment as a specific example has generally the same size as that of the first embodiment with an exception that the preventing block 5d has 4 mm width and 39 mm length, while the lateral groove 52d has 4 mm width and 2 mm length. According to the seventh embodiment, the center of the preventing block 51d is agreed with the outer end of the inside notch 11.

Figure 8:
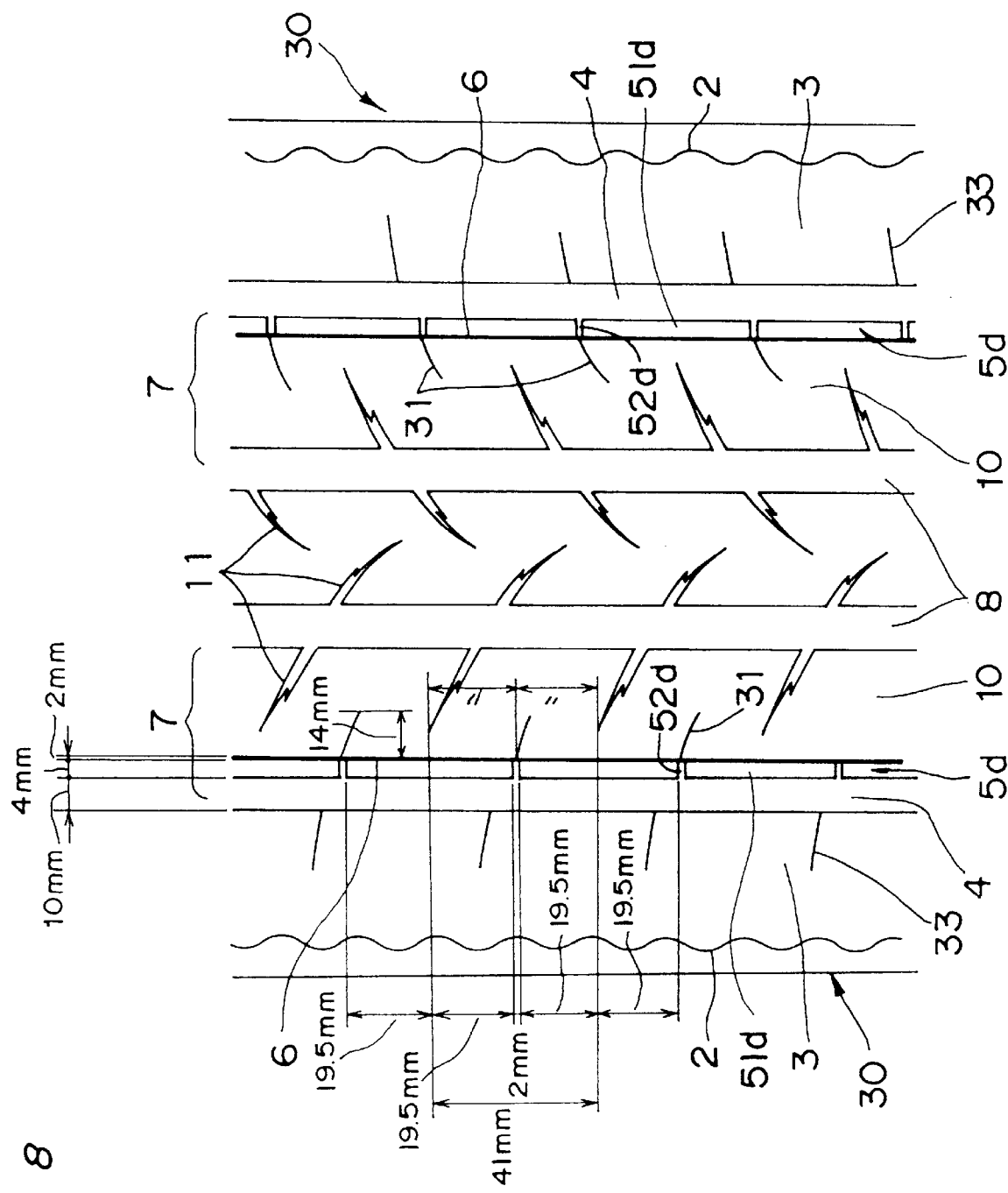
FIG. 8 is a partially-enlarged plan view of a pneumatic tire for heavy load according to an eighth embodiment of the present invention.

A pneumatic tire for heavy load of an eighth embodiment according to the present invention is clearly shown in FIG. 8.

The tire has many outside notches 31 formed every predetermined distance at the side of the irregular abrasion preventing land 51d of the main body 10 of the tire in FIG. 7, namely, seventh embodiment. The outside notches 31 are alternately disposed to the inside notches 11 in the circumferential direction of the tire, the reason for which reads the same as in the second embodiment discussed before.

Although the tire of the eighth embodiment as a specific example has generally the same size as that of the seventh embodiment, the outside notch 31 is 14 mm wide.

Figure 11B:
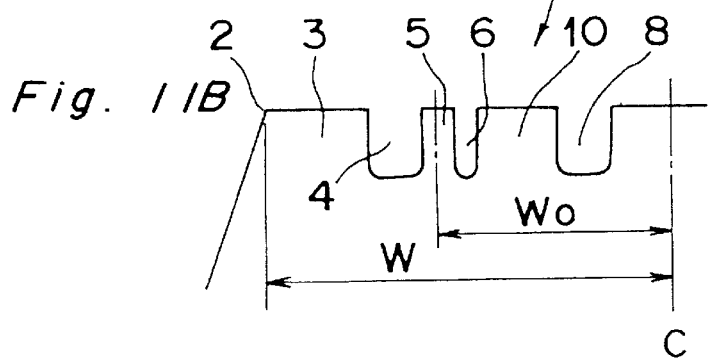
FIG. 11B is an explanatory diagram of W and $W_0$ of the tire.

Referring to FIG. 11B, in any of the foregoing embodiments, supposing that the distance from the center C of the tire in the widthwise direction of the tire to the shoulder edge 2 is W and the distance from the center C to the center of the irregular abrasion preventing land 5 at the side of the shoulder is $W_0$, the irregular abrasion preventing land 5 (specifically, the wide parts 5a, 51c of the preventing lands 5a, 5c in the first, second, fifth, and sixth embodiments, and the irregular abrasion preventing blocks 51b, 51d of the respective preventing lands 5b, 5d in the third, fourth, seventh, and eighth embodiments) is so positioned as to satisfy $0.50 \leq (W_0/W) < 0.85$. The reason for this is that the difference in the outer diameter of edges of lands inside ¼ the width of the tread (where $W_0/W=0.50$) to the center of the tire is small and the pressure when the tire comes in touch with the ground is nearly uniform, hence without necessities to eliminate slipping of the tire by means of the edge of the land 5. If $(W_0/W)$ is not smaller than 0.85, the shoulder land becomes too small in width, losing the rigidity. In consequence of this, the tire is unable to take a good grip on the ground at the cornering time and the turning performance is deteriorated.

Figure 11C:
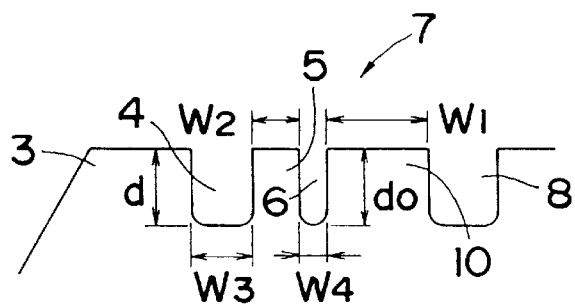
FIG. 11C is an explanatory diagram of $W_1$, $W_2$, $W_3$, $W_4$, $d_0$ d of the tire.

Further, referring to FIG. 11C, supposing that the width of the land 10 excluding the irregular abrasion preventing land 5 in the second land 7 from the shoulder edge 2 is $W_1$ (or $W_2$ for the wide parts 51a, 51c of the irregular abrasion preventing lands 5a, 5c in the first, second, fifth, and sixth embodiments and for the irregular abrasion preventing blocks 51b, 51d in the third, fourth, seventh, and eighth embodiments), the width of the irregular abrasion preventing land 5 is $W_2$, the width of the first main groove 4 from the shoulder edge 2 is $W_3$, the width and depth of the slim groove 6 defined between the land 5 and the main body 10 of the second land 7 are designated by $W_4$ and $d_0$, and the depth of the first main groove 4 is d, $\frac{1}{3} \leq (d_0/d) \leq 1$, $0.03 \leq (W_2/W_1) \leq 0.20$ and moreover $(W_4/W_3) \leq 0.20$ are held. It is not effective when the depth $d_0$ is too small. If $(W_2/W_1)$ is smaller than 0.03, the rigidity of the preventing land 5 is lowered too much, and therefore the preventing land bends in the axial direction when the tire hits the ground, deteriorating the effect thereof. Meanwhile, in order for the preventing land 5 to work efficiently even when the transverse force is impressed to the turning tire of a turning vehicle, it is more suitable that $(W_2/W_1)$ is 0.1 or larger. If $(W_2/W_1)$ exceeds 0.2, the difference of the rigidity between the land 5 and the main body 10 is decreased, making it impossible to concentrate the abrasion force on the preventing land 5. Furthermore, even when $(d_0/d)$ is larger than 1, the effect of the preventing land 5 hardly changes and the gauge under the bottom of the groove cannot be made uniform due to the increased depth $d_0$. The slim groove 6 is sufficiently useful even in the case where the slim groove 6 is formed by being cut by a knife or the like not to have much width. The width $W_4$ of the slim groove 6 is therefore 3.0 mm or smaller, more preferably, 2.0 mm or smaller. If the slim groove 6 is wider, the main body 10 never comes in touch with the preventing land 5 when the tire touches the ground, and the interaction described earlier is not fulfilled, making it impossible to prevent the irregular abrasion of the main body 10.

Figure 11D:
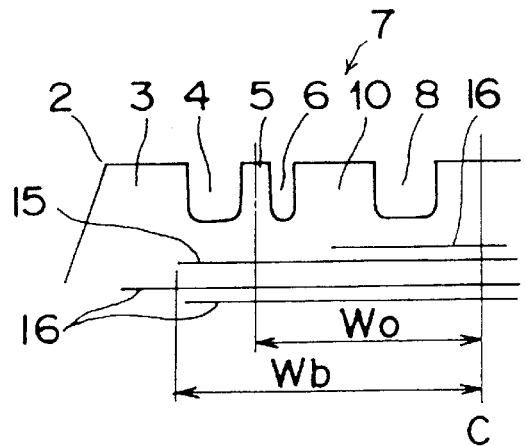
FIG. 11D is an explanatory diagram of $W_0$ and $W_b$ of the tire.

As in FIG. 11D, it is so arranged that the width $W_b$ of a second longest breaker 15 from the center C of the tire satisfies $0.60 \leq (W_0/W_b) \leq 0.90$, because it is not effective to provide the irregular abrasion preventing land 5 in the vicinity of an edge of the second longest breaker 15. That is, it is favorable to set the preventing land 5 at a region where the rigidity of the breaker of three sheets is constant.

Figure 11E:
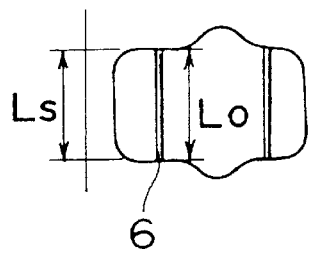
FIG. 11E is an explanatory diagram of the shape when the tire comes in touch with the ground.
Figure 12A:
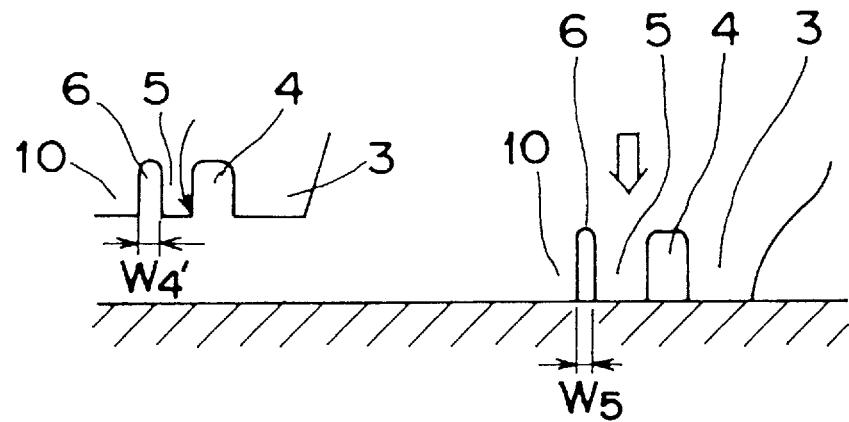
FIG. 12A is an explanatory diagram of the tire before touching the ground.

Referring further to FIGS. 11E and 12A, assuming that Ls indicates the length of the tire in the circumferential direction when the tire is in touch with the ground at the outermost circumference and $L_0$ is the length at the center of the slim groove 6 in the circumferential direction of the tire in touch with the ground, the shape of the tire at this time holds $0.95 \leq (L_0/L_s) \leq 1.15$. The tread radius (TR) is suitably 450–700. In the event that the tread radius exceeds 700 or $(L_0/L_s)$ is smaller than 0.95, the central part of the second land 7 is irregularly abraded more, resulting in the punching abrasion. If the tread radius is smaller than 450 or $(L_0/L_s)$ is larger than 1.15, the irregular abrasion is brought about large in the vicinity of the shoulder edge 2 and no effect is attained from the preventing land.

When $W_5$ is the width of the slim groove 6 when the tire is in touch with the ground and $W_4$ is the width of the bottom of the groove 6, and moreover $W_4'$ is the width of an opening at the surface of the slim groove 6, $0 \leq W_5 < (W_4'/2)$ is satisfied in order to maintain the rigidity of the land 5 when the preventing land 5 touches the ground.

Comparative experiments conducted between the first through eighth embodiments of the present invention and a first through fourth comparison examples will now be depicted below.

Figure 12B:
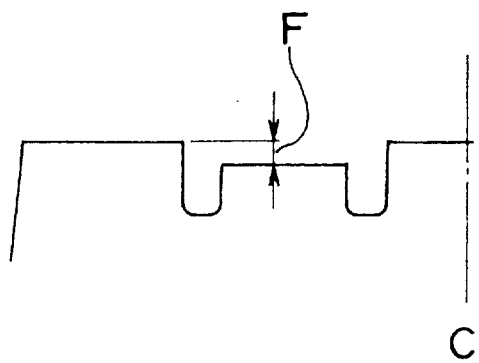
FIG. 12B is an explanatory diagram of the index of irregular abrasion.

The index of irregular abrasion after a 2—2•D 10 ton truck with 11R22.5 steel radial tires (1 steel case 90°, four-sheet steel breaker) runs 50,000 km is measured. The smaller the index of irregular abrasion is, the less the irregular abrasion is brought about. Specifically, the index of irregular abrasion represents the amount F of the step difference generated at a part of the second land at the side of the shoulder (average value obtained from twice the values measured at 8 points of the second land in the circumferential direction), as shown in FIG. 12B. The result of the experiments is shown in Table 1 below.

The first through fourth comparison examples are illustrated in FIGS. 14–17 respectively.

Figure 14:
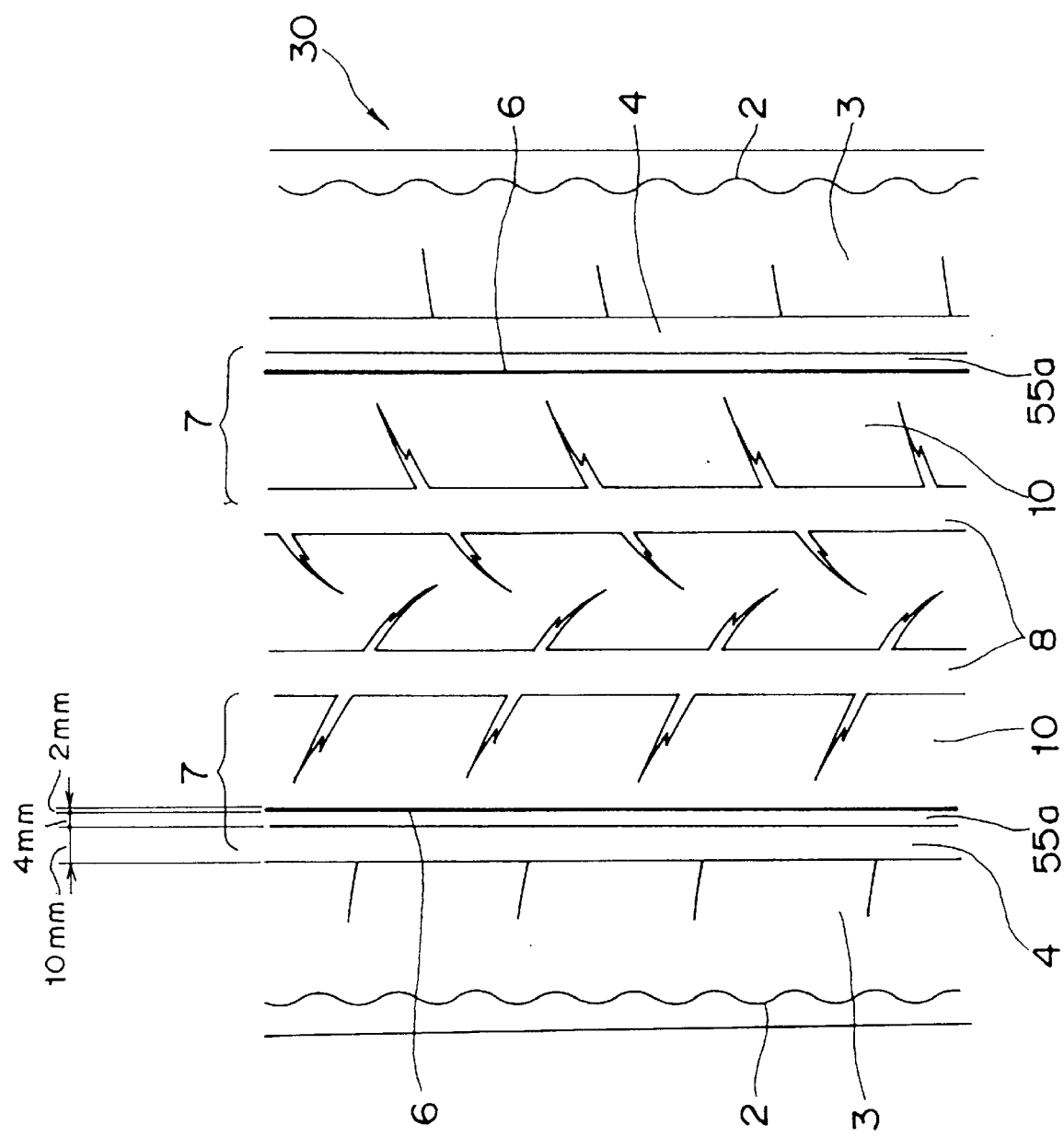
FIG. 14 is a partially-enlarged plan view of a tire according to a first comparison example.

According to the first comparison example, unlike the first and second embodiments wherein the narrow and wide parts are alternately formed as the preventing land, an irregular abrasion preventing land 55a is shaped in the form of a simple longitudinal band having a predetermined width, for example, 4 mm in the above specific example of the first embodiment, as shown in FIG. 14.

Figure 15:
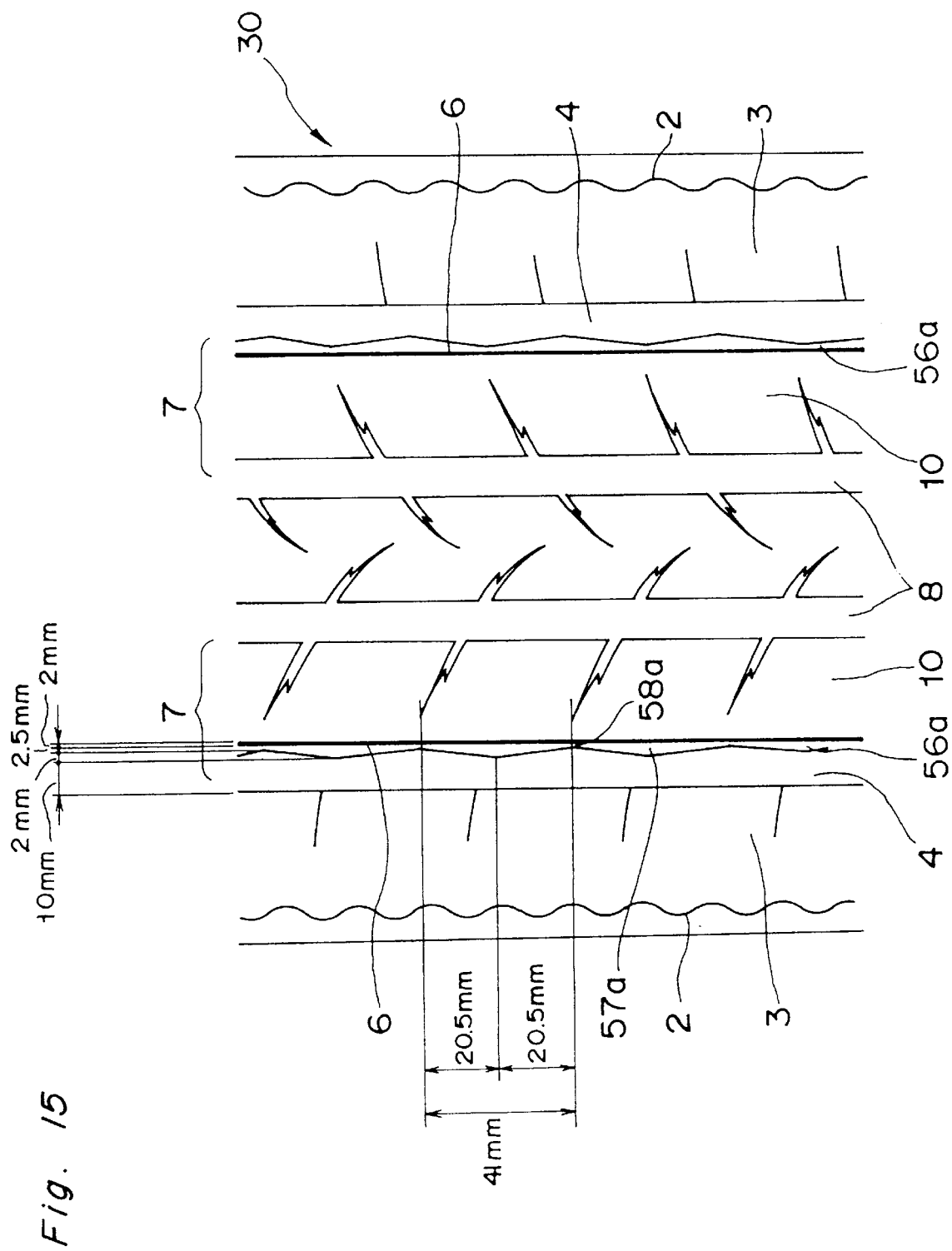
FIG. 15 is a partially-enlarged plan view of a tire according to a second comparison example.

An irregular abrasion preventing land 56a in the second comparison example has, as in FIG. 15, wide and narrow parts 57a and 58a similar to the irregular abrasion preventing land 5a of the first and second embodiments of the present invention. However, it is different from the first and second embodiments that the center of each narrow part 58a is positioned at the outer end of the inside notch 11. In the specific example of the first embodiment, the maximum width of the wide part 57a is 2 mm, the minimum width of the narrow part 58a is 2.5 mm, and the distance between the centers of the narrow and wide parts 57a, 58a is 20.5 mm.

Figure 16:
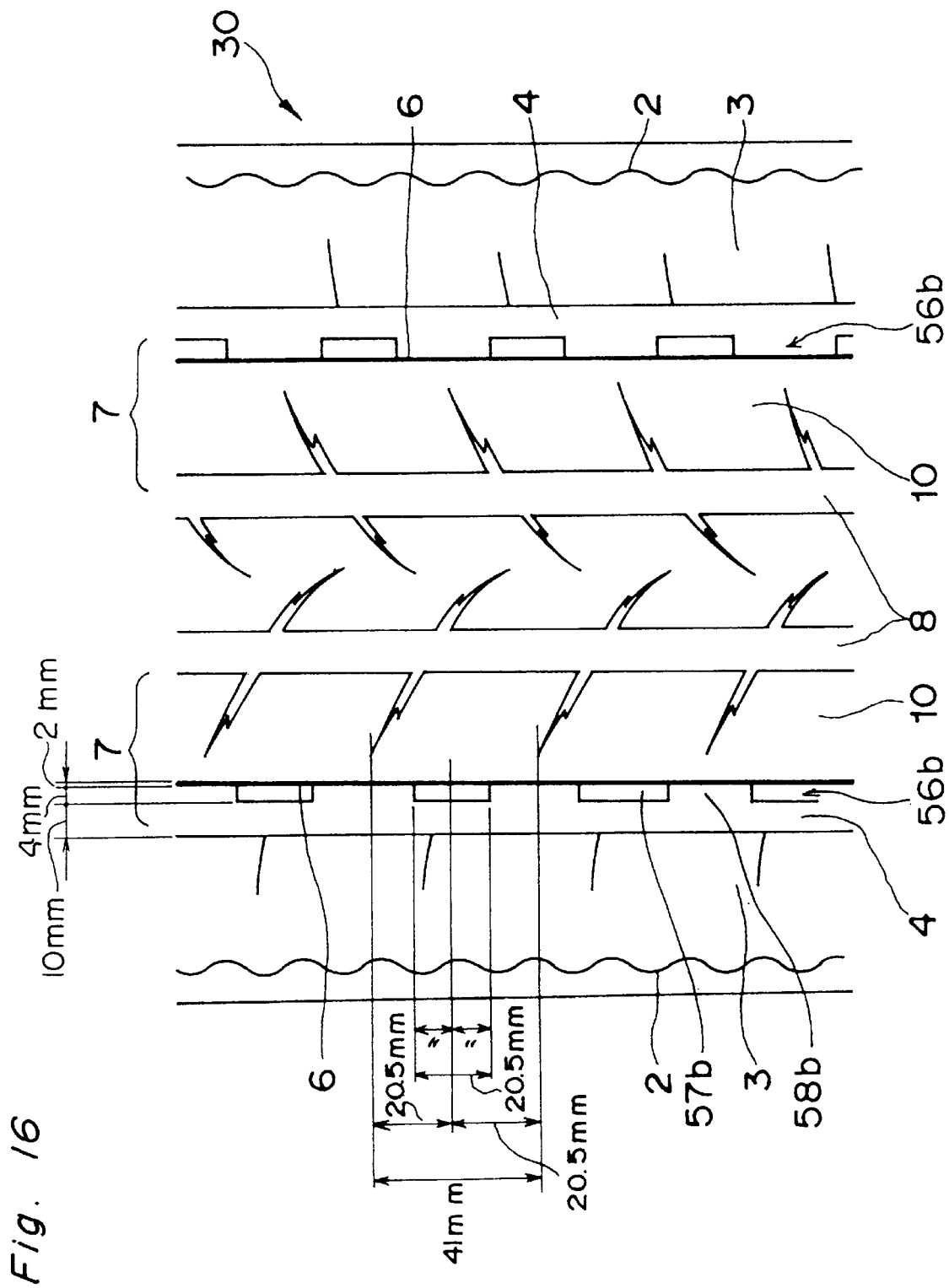
FIG. 16 is a partially-enlarged plan view of a tire according to a third comparison example.

In the meantime, an irregular abrasion preventing land 56b according to the third comparison example, as shown in FIG. 16, has many irregular abrasion preventing blocks 57b divided by lateral grooves 58b, similar to the irregular abrasion preventing land 5b in the third and fourth embodiments of the present invention. The center of the lateral groove 58b in the middle of the adjacent preventing blocks 57b is at the outer end of the inside notch 11, which is a difference from the third and fourth embodiments. The preventing block 57b and the lateral groove 58b are each 4 mm wide and 20.5 mm long in the specific example of the third embodiment.

Figure 17:
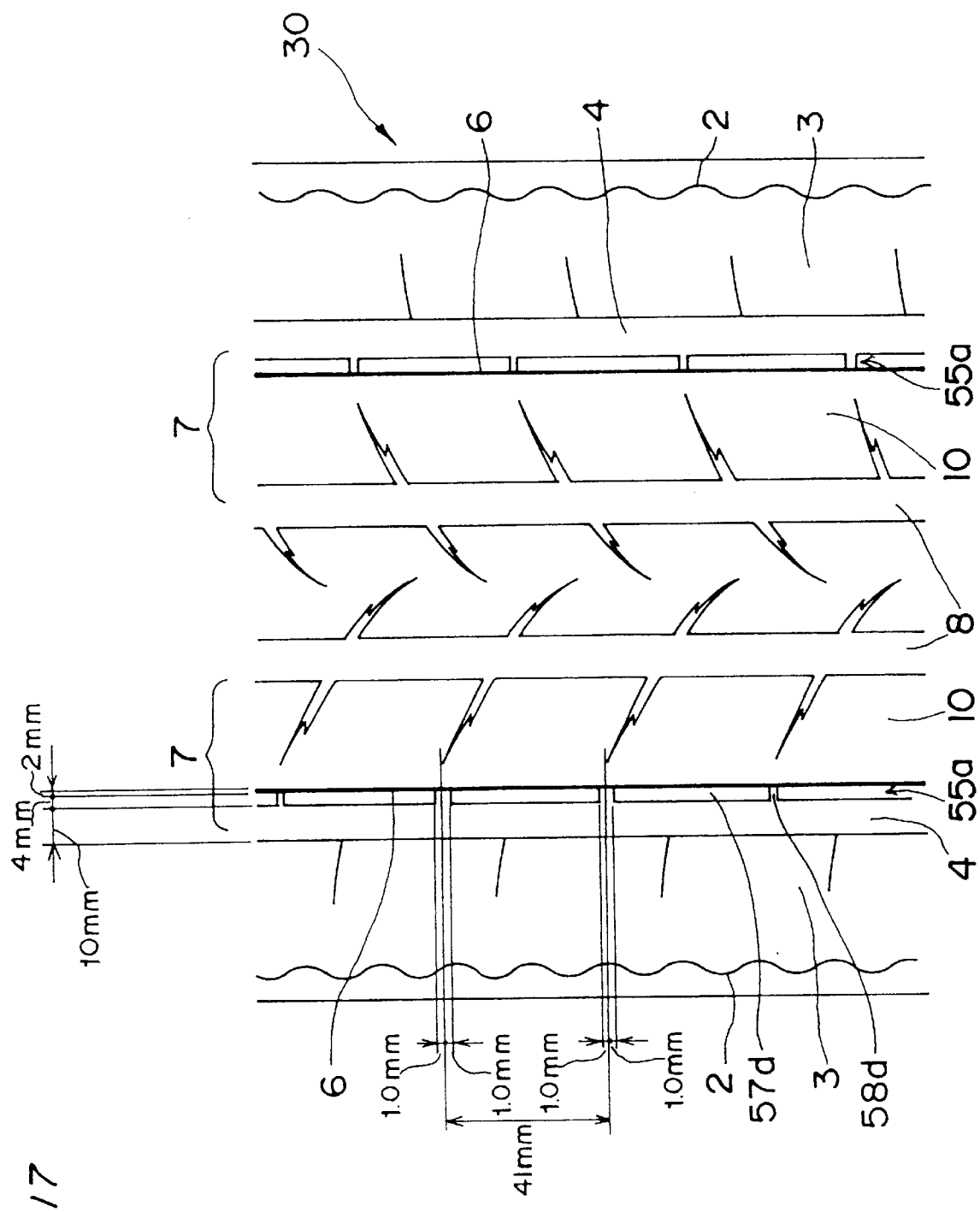
FIG. 17 is a partially-enlarged plan view of a tire according to a fourth comparison example.

An irregular abrasion preventing land 56d in the fourth comparison example, as shown in FIG. 17, has many irregular abrasion preventing blocks 57d divided by lateral grooves 58d, similar to the seventh and eighth embodiments of the present invention. However, the center of the lateral groove 58d between the adjacent blocks 57d is set at the outer end of the inside notch 11, not similar to the irregular abrasion preventing land 5d of the seventh and eighth embodiments. In the specific example of the seventh embodiment, the preventing block 57d is 4 mm wide, 39 mm long, and the lateral groove 58d is 4 mm wide and 2.0 mm long.

TABLE 1

| | Embodiments of the Invention | | | | | | | |
|---|---|---|---|---|---|---|---|---|
| No. | 1st | 2nd | 3rd | 4th | 5th | 6th | 7th | 8th |
| Index of irregular abrasion | 140 | 145 | 130 | 135 | 140 | 145 | 115 | 120 |
| | Comparison Examples | | | | | | | |
| No. | 1st | 2nd | 3rd | 4th | | | | |
| Index of irregular abrasion | 100 | 90 | 95 | 95 | | | | |

Figure 13:
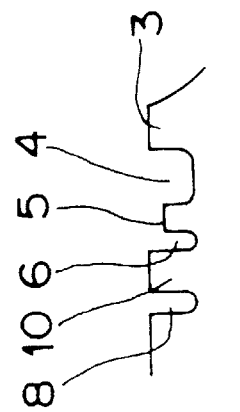
FIG. 13 is an explanatory diagram of the state of abrasion of the tire in any of the embodiments.
Figure 13:
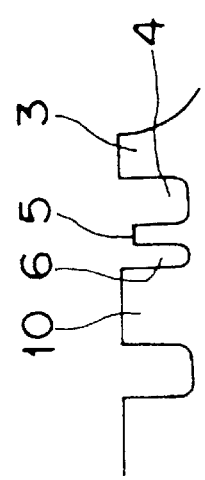
Figure 13:
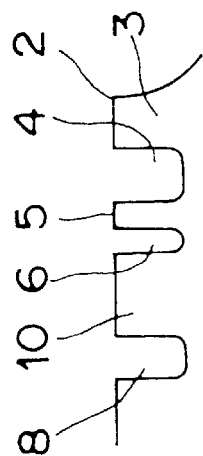

The condition of the abrasion of the tire in each of the above embodiments is shown in FIG. 13. Indication (a) in FIG. 13 shows the tire not yet used. With the use of the tire, the step difference is sequentially increased or decreased, resulting in the abrasion as shown in indications (b) and (c) of FIG. 13. Since the irregular abrasion preventing land 5 is formed generally in the same height as the main body 10, the preventing land 5 is allowed to be in touch with the road surface in any using condition, so that the irregular abrasion is effectively prevented.

In the first through eighth embodiments as above, the irregular abrasion preventing land 5 of different widths in the circumferential direction of the tire is provided at the second land 7 at the side of the shoulder via the slim groove 6. Moreover, narrow parts of the preventing land 5 are alternately arranged to the inside notches in the circumferential direction of the tire, or the preventing land 5 is formed of irregular abrasion blocks via the slim groove 6 only at a part where the tire is abraded irregularly in a manner that the blocks confront the inside notches in the circumferential direction of the tire. Therefore, while the tire is not required to be kept extremely in an elliptic shape when touching the ground, the irregular abrasion at the edge of the second land at the side of the shoulder which is inside the tire can be prevented. Owing to this feature to prevent the irregular abrasion at the shoulder edge, the tire never lacks good grip on the occasion of cornering, assuring smooth running. Moreover, since the width of the irregular abrasion preventing land 5 is changed so as to prevent the second land 7 from bending, slipping of the tire due to the bending force acting to the second land 7 from the external force through the road surface can be avoided. It is to be noted here that the effect is particularly noticeable when any of the above-described embodiments is applied to a tire of 75% or lower flatness. As the flatness is increased, the sidewall shows higher rigidity and it is easy that the shape of the tire in touch with the ground is rectangular, or generally rectangular with curved and recessed in its up-and-down direction. Further, in each of the foregoing embodiments, the tread radius when the air pressure is standard is preferably 450–700 by the reason that $0.95 \leq (L_0/L_s) \leq 1.15$ is held thereby to prevent the irregular abrasion at the shoulder and central part of the tire.

Figure 18A:
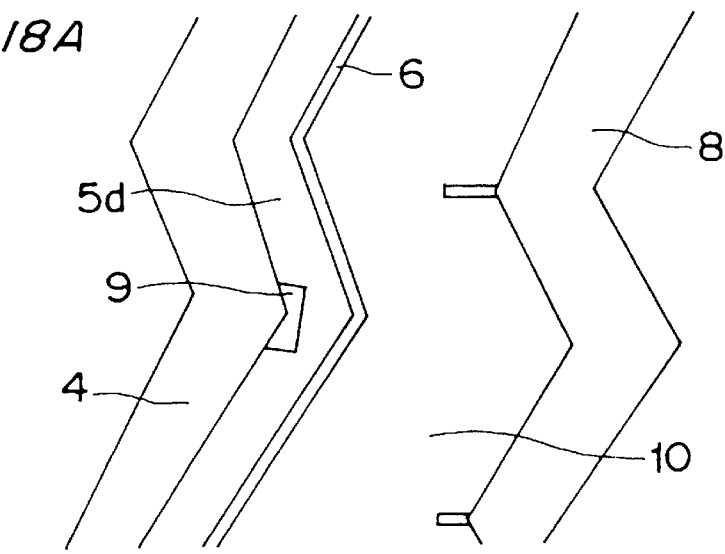
FIGS. 18A, 18B, and 18C are enlarged plan views of portions of the tires in different embodiments of the present invention.
Figure 18B:
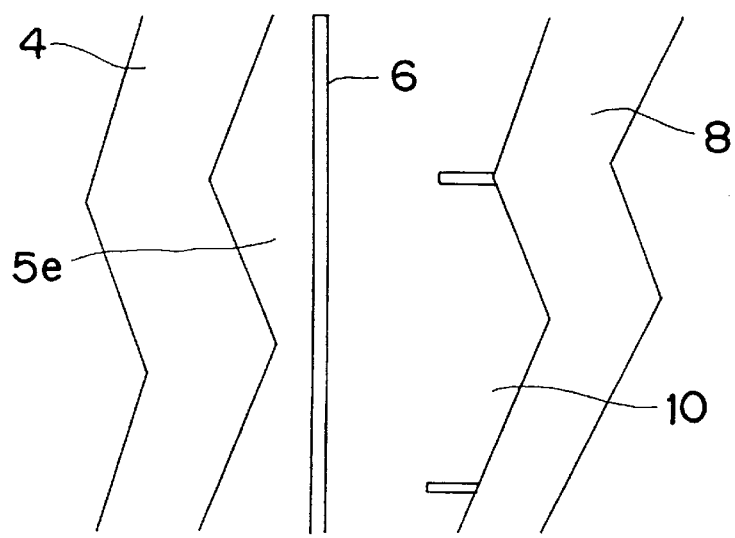
Figure 18C:
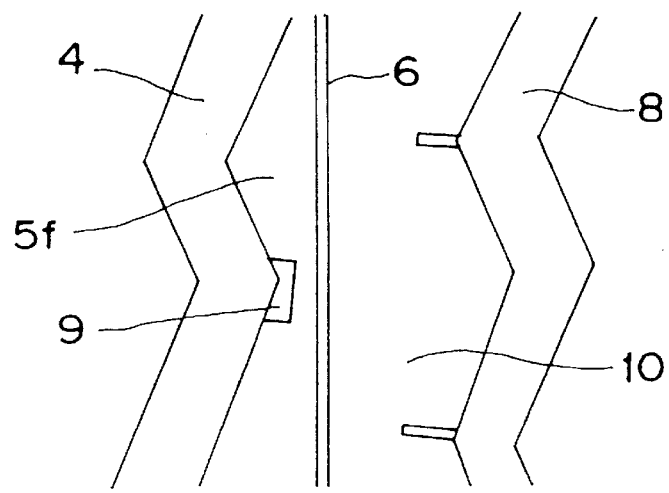

The present invention is not limited to the above first through eighth embodiments, but may be embodied in various kinds of forms. For instance, the main groove may be formed zigzag, not straight, upon necessities. The reason is that the mechanism of the second land 7 and the irregular abrasion preventing land 5 is not changed. Concrete examples of such different embodiment are indicated in FIGS. 1BA, 18B, and 18C. In FIG. 18A, both the main grooves 4, 8 and the slim groove 6 are zigzag, and the irregular abrasion preventing land 5d is provided with a recessed groove 9 at the side of the shoulder. Meanwhile, in FIG. 18B, the main grooves 4, 8 are formed zigzag, whereas the slim groove 6 is straight, with no recessed groove 9 in the irregular abrasion preventing land 5e. FIG. 18C shows an arrangement in which the main grooves 4, 8 are zigzag, the slim groove 6 is straight and the irregular abrasion preventing land 5f has a recessed groove 9 at the side of the shoulder.

In the constitution of the present invention, the irregular abrasion preventing land of different widths in the circumferential direction of a tire is arranged via the slim groove at the second land at the shoulder side. Narrow parts of the preventing land and inside notches are alternately disposed in the circumferential direction of the tire, or the preventing land is formed of irregular abrasion blocks via the slim groove to confront the inside notches in the circumferential direction of the tire. Therefore, even if the touch length of the shoulder is elongated to increase the touch pressure of the shoulder part and consequently the touch pressure in the vicinity of the second land becomes insufficient thereby to cause slipping, the irregular abrasion is prevented from being brought about at the edge of the second land at the side of the shoulder. Both the irregular abrasion of the shoulder and that of the second land are prevented. The tire is not insufficient to grip the ground at the cornering time which would result from the irregular abrasion, thus ensuring smooth running of a vehicle. Moreover, since the width of the abrasion preventing land is changed in a manner to prevent bending of the second land, the bending force to the second land against the external force from the road surface is absorbed by the preventing land, whereby slipping of the second land due to the bending force is prevented.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A pneumatic tire for heavy load comprising:

a tire tread having a shoulder edge and a center, which when viewed from the shoulder edge to the center of the tire, includes a first land portion adjacent to the shoulder edge, a first main groove having outer and inner edges adjacent to the first land portion, an irregular abrasion preventing land portion which defines the inner edge of said first main groove, a narrow groove adjacent to the irregular abrasion preventing land portion, and a second land portion having an outside edge defined by the narrow groove and an inside edge defined by a second main groove, the irregular abrasion preventing land portion being divided into irregular abrasion preventing blocks by lateral grooves;

a plurality of inside slots or sipes at the inside edge of the second land portion; and a plurality of outside slots or sipes formed to extend from the narrow groove partially into said second land portion, said outside slots or sipes being disposed between the inside slots or sipes and between the irregular abrasion preventing blocks, wherein the irregular abrasion preventing land portion is generally the same height as the second land portion when the tire is not in use, and the irregular abrasion preventing blocks are disposed to confront the inside slots or sipes in the axial direction of the tire, and wherein the first land portion defines the outer edge of the first main groove to be circumferentially straight, the narrow groove is formed circumferentially straight, and the second main groove is formed circumferentially straight.

2. The pneumatic tire for heavy load according to claim 1, wherein $0.03 \leq (W_2/W_1) \leq 0.20$ where a width of the second land portion is $W_1$, and a width of the irregular abrasion preventing land is $W_2$.

3. The pneumatic tire for heavy load according to claim 1, wherein a width $W_4$ of the narrow groove is therefore 3.0 mm or smaller.

4. The pneumatic tire for heavy load according to claim 1, wherein $1/3 \leq (d_0/d) \leq 1$ where a depth of the narrow groove is designated by $d_0$, and a depth of the first main groove is d.

5. The pneumatic tire for heavy load according to claim 1, wherein said outside slots or sipes each have an outer end on the outside edge, and wherein the outer end of one of said outer slots or sipes is centered circumferentially between adjacent outer ends of inside slots or sipes which are located a distance M apart such that the outer end of the one of outer slots or sipes is not removed from the center of the distance M between the adjacent outer ends of the inside slots or sipes an amount larger than 0.3 times the distance M.

* * * * *